United States Patent

Brückner et al.

Patent Number: 6,156,446
Date of Patent: Dec. 5, 2000

[54] CERAMIC COMPOSITE STRUCTURE AND PROCESS FOR THE PRODUCTION THEREOF

[75] Inventors: Raimund Brückner, Nierdernhausen; Daniel Grimm, Schwalbach, both of Germany

[73] Assignee: Didier-Werke AG, Wiesbaden, Germany

[21] Appl. No.: 09/194,345

[22] PCT Filed: May 17, 1997

[86] PCT No.: PCT/DE97/01019

§ 371 Date: Mar. 29, 1999

§ 102(e) Date: Mar. 29, 1999

[87] PCT Pub. No.: WO97/44152

PCT Pub. Date: Nov. 27, 1997

[30] Foreign Application Priority Data

May 21, 1996 [DE] Germany .......................... 196 20 403

[51] Int. Cl.[7] .................................................. B32B 9/00
[52] U.S. Cl. .................. 428/701; 428/701; 428/702; 428/212; 428/408; 264/29.7; 264/44
[58] Field of Search .................................... 428/701, 702, 428/212, 408; 264/29.7, 44

[56] References Cited

U.S. PATENT DOCUMENTS

| 5,052,597 | 10/1991 | Bruckner | 222/593 |
| 5,054,664 | 10/1991 | Bruckner | 222/590 |
| 5,413,744 | 5/1995 | Bruckner et al. | 264/25 |

FOREIGN PATENT DOCUMENTS

| 0 379 647 | 8/1990 | European Pat. Off. . |
| 0 526 718 | 2/1993 | European Pat. Off. . |
| 41 08 153 | 9/1992 | Germany . |
| 62-282904 | 12/1987 | Japan . |
| 02172859 | 12/1995 | Japan . |

*Primary Examiner*—Deborah Jones
*Assistant Examiner*—Jason Resnick
*Attorney, Agent, or Firm*—John F. A. Earley; John F. A. Earley III; Harding, Earley, Follmer & Frailey

[57] ABSTRACT

The invention relates to a one-part, fire resistant ceramic composite structure consisting of at least two adjacent layers. The substantial mass portion of the layers consists of an identical, fire-resistant ceramic material, and the remaining mass portion is selected in relation to each layer in such a manner that at least one layer couples inductively subject to the influence of a magnetic field, whereas at least one other layer does not couple subject to the influence of said electromagnetic field. However, all layers have the same thermal coefficient of expansion.

15 Claims, No Drawings

CERAMIC COMPOSITE STRUCTURE AND PROCESS FOR THE PRODUCTION THEREOF

BACKGROUND OF THE INVENTION

The present invention pertains to a one-piece, refractory ceramic composite body consisting of at least two layers located next to one another as well as to a process for manufacturing same.

Such a composite body has been known from DE 41 08 153 A1. It is called a "refractory molding" there and it has at least two nonmetallic shells that envelope one another at least partially.

Moldings and composite bodies of this type are used, e.g., as wearing parts in the spouts of metallurgical vessels (so-called nozzles, pouring spouts and channels, submerged pipes, but also as sliding plates or the like).

The prior-art refractory molding comprises essentially an inner shell and an outer shell, which are prefabricated in a tubular shape. While the outer shell is said to consist essentially of carbon-bound aluminum oxide according to one embodiment, zirconium dioxide is selected as the material for the inner shell.

The material for the outer shell was selected from the viewpoint that the outer shell shall be able to be heated inductively in an electromagnetic field. It is achieved as a result that the inner shell can be preheated slowly and uniformly to a value close to its operating temperature. The risk of cracking is avoided as a result. Due to the inductive heating of the inner shell, it assumes the conduction of heat to the outer shell.

To prepare the prior-art refractory molding, it is necessary to prefabricate the inner shell and the outer shell separately and to subsequently prepare a composite body. This is difficult, among other things, even because of the small wall thicknesses of the moldings.

A refractory casting sleeve for a metallurgical vessel, which consists of, e.g., zirconium carbide and has an inner carbon coating, has been known from FR-PS 1 525 154. The casting sleeve is surrounded by an induction coil, by means of which the casting sleeve is heated.

According to the suggestion made in EP 0 379 647 B1, the induction coil is part of the inner wall of a multilayer, refractory ceramic tubular body.

A process for the inductive heating of a molding made of ceramic material, which does not couple inductively at room temperature, but can be coupled to the field of the inductor at increased temperature, is described in DE 43 01 330 A1. The tubular molding consists of zirconium dioxide, which is practically electrically nonconductive at ambient temperature but which develops electric conductivity at increased temperatures, beginning at, e.g., 800° C. The molding is provided on the inside with a coating that is electrically conductive even at room temperature.

The refractory nozzle according to DE 44 28 297 A1 consists of a wear-resistant core consisting of zirconium dioxide, which is provided with a pouring opening, and a jacket surrounding same, consisting of a carbon-bound ceramic material, which can be heated inductively beginning from room temperature. The jacket is shaped around the prefabricated core and is compacted.

The inductive heating of the said refractory ceramic wearing parts represents a considerable technological progress over conventional methods of preheating (e.g., by direct exposure to burner flames), because a uniform, "soft" heating of the component is achieved, so that chipping off or cracking due to different heat zones in the component can be practically ruled out. As a result, the essential safety of such parts is substantially increased, for example in the spout area of a metallurgical melting vessel.

SUMMARY OF THE INVENTION

Based on the state of the art described in the introduction, the basic object of the present invention is to offer a refractory ceramic body that can be heated directly or indirectly in the electromagnetic field of an induction coil and makes possible a simplified manufacture compared with the prior-art moldings. In addition, workpieces (moldings) with small wall thicknesses, such as submerged spouts, shall also be covered.

The present invention is based on the consideration that the manufacture of such a component is facilitated if the entire body is manufactured, at least initially, from one and the same refractory ceramic material or at least the predominant weight percentages of individual layers of the body consist of an identical refractory ceramic material. Additional measures, which can be carried out in various embodiments, are then to be taken to form individual layers that can be inductively coupled and other layers that cannot be inductively coupled in such a composite body.

DETAILED DESCRIPTION

In a first embodiment, the predominant weight percentage of the layers consists of an identical refractory ceramic material, and the remaining weight percentage with respect to each layer is selected such that at least one layer couples inductively under the effect of an electromagnetic field, while at least one other layer does not couple under the effect of this electromagnetic field, but all layers have the same coefficient of thermal expansion.

The term "same" coefficient of thermal expansion does not necessarily mean that the individual layers must have an identical coefficient of thermal expansion; what is more important is that the coefficients of thermal expansion of the inductively coupling and inductively non-coupling layers be coordinated with one another such that no thermal contractions or expansions occur between the individual layers. In this sense, the term "same" coefficients of thermal expansion means an approximation of the coefficients of thermal expansion in the sense of the prevention of cracking or the prevention of chipping. This object is decisively influenced by the selection of materials that are identical at least in respect to their predominant weight percentages for the individual layers.

The desired object can also be accomplished in an alternative embodiment by the weight percentages of the layers consisting completely or at least predominantly of an identical refractory ceramic material, but the structure (structural constitution) of at least one layer is selected to be such that this layer will inductively couple under the effect of an electromagnetic field, while the structure (structural constitution) of at least one other layer is selected to be such that it does not couple inductively under the effect of the electromagnetic field.

While the individual layers are specifically changed chemically/mineralogically by changing minor weight percentages (usually 0.2 mass. % to 12.0 mass. %) in the first embodiment, the alternative embodiment is based on the idea of changing the structure, but the individual layers shall have the "same" coefficient of thermal expansion in this case as well.

The predominant weight percentage of the layers may consist of, e.g., zirconium dioxide in the first embodiment. The zirconium dioxide may be partially or completely stabilized by the addition of small amounts of yttrium oxide ($Y_2O_3$), magnesium oxide (MgO), calcium oxide (CaO) and/or oxides of the rare earths. Their percentage is, e.g., between 7 mol. % and 12 mol. %.

The differentiation of the layers of the composite body that can be inductively coupled and that cannot be inductively coupled is performed either by the weight percentages of the said stabilizing agents or by specifically selecting these stabilizing agents within the individual layers, and it is proposed according to another embodiment that the inductively coupling layer be made of zirconium dioxide stabilized with yttrium oxide and/or oxides of the rare earths and that the layer that cannot be inductively coupled be made of zirconium dioxide stabilized with magnesium oxide or calcium oxide.

The incorporation of a carbon carrier, such as graphite and/or carbon black, in the refractory ceramic material of the inductively coupling layer also leads to the desired result. The carbon may be in the form of, e.g., fibers, and, according to one embodiment, it has the geometry of a fiber network, which is incorporated in the refractory ceramic matrix material.

Concerning the alternative embodiment, which is characterized by a different structure of the individual layers, preliminary experiments have shown that high apparent densities, brought about by, e.g., an increased carbon content in the refractory matrix material, lead to increasing inductive coupling of the corresponding layer or, in other words, it is possible to form inductively noncoupling layers by forming, e.g., individual layers with higher porosity compared with other layers. The porosity may be set by the subsequent removal, especially the burning out, of individual components of individual layers, starting from a basic body having a homogeneous material.

Another embodiment of the present invention provides in this connection a composite body in which the inductively coupling layer contains at least one organic synthetic resin, such as phenol-novolak resin, which also assumes a binder function at the same time.

To manufacture such a composite part, the entire composite body may be manufactured, as was explained in the introduction, of the said resin-bound ceramic material containing up to 35 wt. % of carbon and the carbon may be subsequently burned out in another process step on at least one surface of the composite body, while a layer of the composite body that cannot be coupled inductively is formed before this layer is subsequently filled and compacted by filling the open pore volume of this layer with a ceramic material that cannot be inductively coupled. This technology may also be carried out in the case of other materials (material combinations).

The inside and the outside are thus treated for special applications, such as submerged spouts. Layers that cannot be coupled inductively are thus formed on the inside and the outside and a core, which is located between them and can be inductively coupled, are formed. If the "treatment" is performed on the end side only (at the submerged end), the end-side front surface is also subjected to finishing analogously to the inside and the outside.

The essential advantage is that a uniform, "homogeneous" body can be first manufactured, which is made into a "composite body" with different layers only by additional process steps by subsequently subjecting individual layers of the composite body to heat treatment and/or physical treatment.

While the carbon content, which is decisive for the inductive coupling, remains unchanged in one layer in a component that is, e.g., a three-layer component at the end, the carbon is subsequently burned thermally out of the surface layers by the technology described.

Thus, the said surfaces subsequently have, of course, an increased porosity, which is, however, undesired for reasons of the wear resistance of the composite body, and the open pore volume is subsequently filled, but now with a ceramic material that cannot be coupled inductively, e.g., a sol or a slip based on zirconium dioxide or other zirconium compounds. The infiltrated material is finally compacted by a subsequent heat treatment (tempering, firing) and the pores are securely closed at the same time. The filling material (e.g., zirconium dioxide) should be selected to be such that the desired high protection against wear is achieved.

If, e.g., a refractory nozzle for pouring a metal melt from a metallurgical vessel is to be manufactured, this nozzle may be built of two layers, wherein the inner layer facing the metal melt can be inductively coupled, and the outer layer cannot be inductively coupled. An inductor arranged around the nozzle will then ensure the inductive heating of the inner layer that can be inductively coupled. The outer layer is subsequently heated slowly and uniformly from inside to outside by heat conduction. Cracking is reliably prevented from occurring due to essentially the same coefficients of thermal expansion of the two layers.

The preheating of the nozzle causes, e.g., frozen metal melt in the passage of the nozzle to melt again.

The induction frequency selected is in the range of 5 to 100 kHz.

What is claimed is:

1. One-piece refractory ceramic composite body comprising at least two layers located next to one another, wherein the predominant weight percentage of the layers consists of an identical refractory ceramic material and the remaining weight percentage is selected with respect to each layer such that at least one layer will couple inductively under the effect of an electromagnetic field, while at least one other layer will not couple under the effect of said electromagnetic field, but all layers have approximately the same coefficient of thermal expansion.

2. One-piece refractory ceramic composite body comprising at least two layers located next to one another, wherein the weight percentage of the layers consists completely or at least predominantly of an identical refractory ceramic material and the structure of at least one layer is selected to be such that this layer couples inductively under the effect of an electromagnetic field, while the structure of at least one other layer is selected to be such that it does not couple inductively under the effect of said electromagnetic field, but all layers have approximately the same coefficient of thermal expansion.

3. Composite body in accordance with claim 1, in which at least the predominant weight percentage of the layers consists of zirconium dioxide, and in which any remaining weight precentage consists of yttrium oxide, magnesium dioxide, calcium oxide, oxides of the rate earths, or combinations thereof, with which the zirconium dioxide is partially or completely stabilized.

4. Composite body in accordance with claim 3, in which the at least one inductively coupling layer consists of zirconium dioxide stabilized with yttrium oxide, oxides of the rare earths, or combinations thereof, and the at least one layer not coupling inductively consists of zirconium dioxide stabilized with magnesium oxides, calcium oxide, or combinations thereof.

5. Composite body in accordance with claim 1, in which carbon is incorporated in the at least one inductively coupling layer.

6. Composite body in accordance with claim 5, in which the carbon is shaped as fibers.

7. Composite body in accordance with claim 5, which the carbon is shaped as a fiber network or a fiber web in the refractory ceramic material.

8. Composite body in accordance with claim 5, in which the at least one inductively coupling layer comprises at least one organic synthetic resin.

9. Composite body in accordance with claim 1, in which the weight percentage of the layers consisting of an identical material is 65 wt. % to 99.8 wt. %.

10. Composite body in accordance with claim 9, in which the weight percentage of the layers consisting of an identical material is 88 wt. % to 99.5 wt. %.

11. Process for manufacturing a composite body in accordance with claim 5, which the entire composite body is manufactured from a resin-bound, carbon-containing refractory ceramic material and the carbon is burned out in a subsequent process step on at least one surface of the composite body to form open pores while forming a layer of the composite body that cannot be coupled inductively, which open pores are subsequently filled with a refractory ceramic material that cannot be coupled inductively which is compacted.

12. Process in accordance with claim 11, in which the open pores are filled with a sol or a slip based on zirconium dioxide which is compacted at increased temperatures.

13. Composite body in accordance with claim 2, in which at least the predominant percentage of the layers consists of zirconium dioxide.

14. Composite body in accordance with claim 2, in which carbon in incorporated in the at least one inductively coupling layer.

15. Process for manufacturing a composite body in accordance with claim 14, in which the entire composite body is manufactured from a resin-bound, carbon-containing refractory ceramic material and the carbon is burned out in a subsequent process step on at least one surface of the composite body to form open pores while forming a layer of the composite body that cannot be coupled inductively.

* * * * *